(12) United States Patent  
Heger et al.

(10) Patent No.: US 8,714,761 B2  
(45) Date of Patent: May 6, 2014

(54) MOUNTING PLATE FOR MIRROR GLASS

(75) Inventors: Sebastian Heger, Bad Windsheim (DE); Werner Lang, Ergersheim (DE)

(73) Assignee: Lang-Mekra North America, LLC, Ridgeway, SC (US)

(*) Notice: Subject to any disclaimer, the term of this patent is extended or adjusted under 35 U.S.C. 154(b) by 705 days.

(21) Appl. No.: 12/892,108

(22) Filed: Sep. 28, 2010

(65) Prior Publication Data

US 2011/0080667 A1 Apr. 7, 2011

(30) Foreign Application Priority Data

Oct. 1, 2009 (DE) .......................... 10 2009 047919

(51) Int. Cl.
*G02B 7/182* (2006.01)

(52) U.S. Cl.
USPC .......................................... 359/871; 359/726

(58) Field of Classification Search
USPC .................... 359/726, 847, 871, 872
See application file for complete search history.

(56) References Cited

U.S. PATENT DOCUMENTS

| 3,337,285 | A | * | 8/1967 | Travis | 359/514 |
| 3,375,053 | A | * | 3/1968 | Ward | 359/864 |
| 3,563,638 | A | * | 2/1971 | Panozzo | 359/864 |
| 4,988,180 | A | * | 1/1991 | Gabas | 359/844 |
| 5,604,644 | A | * | 2/1997 | Lang et al. | 359/871 |
| 5,687,035 | A | * | 11/1997 | Lang | 359/864 |
| 5,786,948 | A | * | 7/1998 | Gold | 359/838 |
| 6,244,716 | B1 | * | 6/2001 | Steenwyk et al. | 359/603 |
| 6,352,348 | B1 | * | 3/2002 | Lang et al. | 359/881 |

FOREIGN PATENT DOCUMENTS

EP 0 659 609 B1 1/1999

* cited by examiner

*Primary Examiner* — Ricky D Shafer
(74) *Attorney, Agent, or Firm* — McNair Law Firm, P.A.; Seann P. Lahey

(57) ABSTRACT

A glass carrier plate that includes a front side, a back side and a circumferential edge zone. A mirror plate with a mirror plate front side, a mirror plate back side and a circumferential edge, wherein the mirror plate back side is attached by means of an adhesive layer on the front side of the glass carrier plate. Holding bars extend from the circumferential edge zone of the front side of the glass carrier plate. The holding bars are distributed over the circumferential edge zone and the circumferential edge of the mirror plate engages the holding bars so that the mirror plate is spaced from and positioned over the front side of the glass carrier plate.

8 Claims, 4 Drawing Sheets

MOUNTING PLATE FOR MIRROR GLASS

BACKGROUND OF THE INVENTION

1) Field of the Invention

The present invention relates to vehicle mirror assemblies, and more particularly, to a glass unit for exterior mirror assemblies in which the mirror plate is spaced from the front side of the carrier plate by a series of holding bars.

2) Description of Related Art

Glass units include a reflective mirror plate, which is fixed to a glass carrier plate. Adhesives are commonly used for securing the components together in a fixed arrangement. In order to hold the mirror plate in the desired position while setting the adhesive and to protect the edge area of the mirror plate from damage, it is known from EP 0 659 609 B1 to provide the glass carrier plate with a circumferential edge within which the mirror plate is fitted. This arrangement, however, requires comparatively low tolerances that must be observed with regard to the shape of the mirror plate contours and the shape of the circumferential edge, which results in higher production costs. Additionally, there is the risk of excess adhesives spilling over onto the edge area between the mirror plate and the circumferential edge and thus the mirror plate becoming contaminated when affixing the mirror plate to the glass carrier plate. This requires elaborate cleaning to remove the adhesive, which also leads to increased production costs.

Accordingly, in view of the problems associated with the teachings in EP 0 659 609 B1 it is, therefore, an object of the present invention to provide a glass unit for vehicle mirrors that guarantees a precise fixing of the mirror plate to the glass carrier plate without having to observe extremely low tolerances during manufacturing.

SUMMARY OF THE INVENTION

The above objective is accomplished according to the present invention by providing a simple and precise fixing of the mirror plate to the glass carrier plate using only distributed holding bars arranged over the edge zone of the glass carrier plate, instead of the circumferential edge on the front side of the glass carrier plate according to EP 0 659 609 B1. The "glass carrier plate", as known to those skilled in the art, is to be understood as not being made of glass, but as a carrier plate supporting a glass element. The glass carrier plate is well known in the art to be made of a plastic or metal. The "edge zone" is to be understood as the part of the glass carrier plate that connects the front and back sides to each other—i.e. the edge of the glass carrier plate —as well as the front side area of the glass carrier plate that connects directly to the edge. The production tolerance requirements for the holding bars are lower in comparison to a circumferential edge because due to the holding bars' inherent elasticity, small deviations in the desired dimensions are compensated by bending when attaching the mirror plate to the glass carrier plate. The production of the glass unit is thus less expensive.

The shadowing effects and the dimensions of the non-reflective surface are minimized because an edge bulge associated with the circumferential edge taught in EP 0 659 609 B1 is not present on the front side of the glass carrier plate according to the present invention. Only the small free ends of the holding bars are recognizable when looking at the mirror; otherwise, the mirror appears to be almost edgeless or frameless.

Because the edge of the mirror plate touches the holding bars, the mirror plate is prefixed in the desired position while setting the adhesive layer during production of the glass unit so that the mirror plate is prevented from slipping while setting the adhesive. The edge of the mirror plate can be completely rounded or include a front side and back side edge.

The holding bars form quasi-reinforcement ribs for the edge zone and glass carrier plate by molding to the edge zone. As a result, the edge zone and/or glass carrier plate as a whole can be comparatively thin. The holding bars can also extend through the edge zone and connect the back side of the glass carrier plate with the edge zone as reinforcement ribs.

In a further advantageous embodiment of the invention, the holding bars each have a contact surface for the edge of the mirror plate. For example, a level contact surface is provided on the holding bars with a generally flat portion that forms the support contact surfaces for engaging the mirror plate. This level contact surface can alternatively be adjusted to the shape of the mirror plate edge in a form fitting arrangement. The distance of the mirror plate from the glass carrier plate and, therefore, the thickness of the adhesive layer are determined by the position of the contact surface on the holding bars. In this way an adhesive layer with a defined thickness and durability results when the glass unit is produced.

In a further advantageous embodiment of the invention, the level contact surface is sloped upwardly from the glass carrier plate. Additionally, the edge of the mirror plate wedges into the contact surfaces of the holding bars when attaching to the glass carrier plate. A centering effect is achieved when assembling the mirror plate by inclining the contact surface. This allows production with higher tolerances.

In a further embodiment, the holding bars taper toward the free ends so that the cross section area of the holding bars is smaller in the area of the free ends than in the areas closer to the glass carrier plate. As a result, the required stability in the support surface area of the mirror plate edge is guaranteed on one hand and the visible free ends of the holding bars mounted on the mirror are smaller on the other hand, whereby the impression of a "frameless mirror" is strengthened.

In a further embodiment, the holding bars have a rectangular cross section, which can be more easily produced with injection molding than holding bars with a round cross section.

In a further embodiment, the free ends of the holding bars do not protrude over the mirror plate front side making them practically invisible to enhance the "frameless" appearance.

In a further embodiment, an overflow channel is provided in the glass carrier plate to prevent the lateral seepage of excess adhesive sideways between the glass carrier plate and mirror plate. The overflow channel is preferably circumferential on the glass carrier plate. In this way, the amount of adhesive applied to the front side of the glass carrier plate can be applied with higher tolerance without leading to expensive finishing treatments to clean adhesive from the mirror plate of the glass unit during production.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that the object and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art.

DETAILED DESCRIPTION OF A PREFERRED EMBODIMENT

Figure 1:
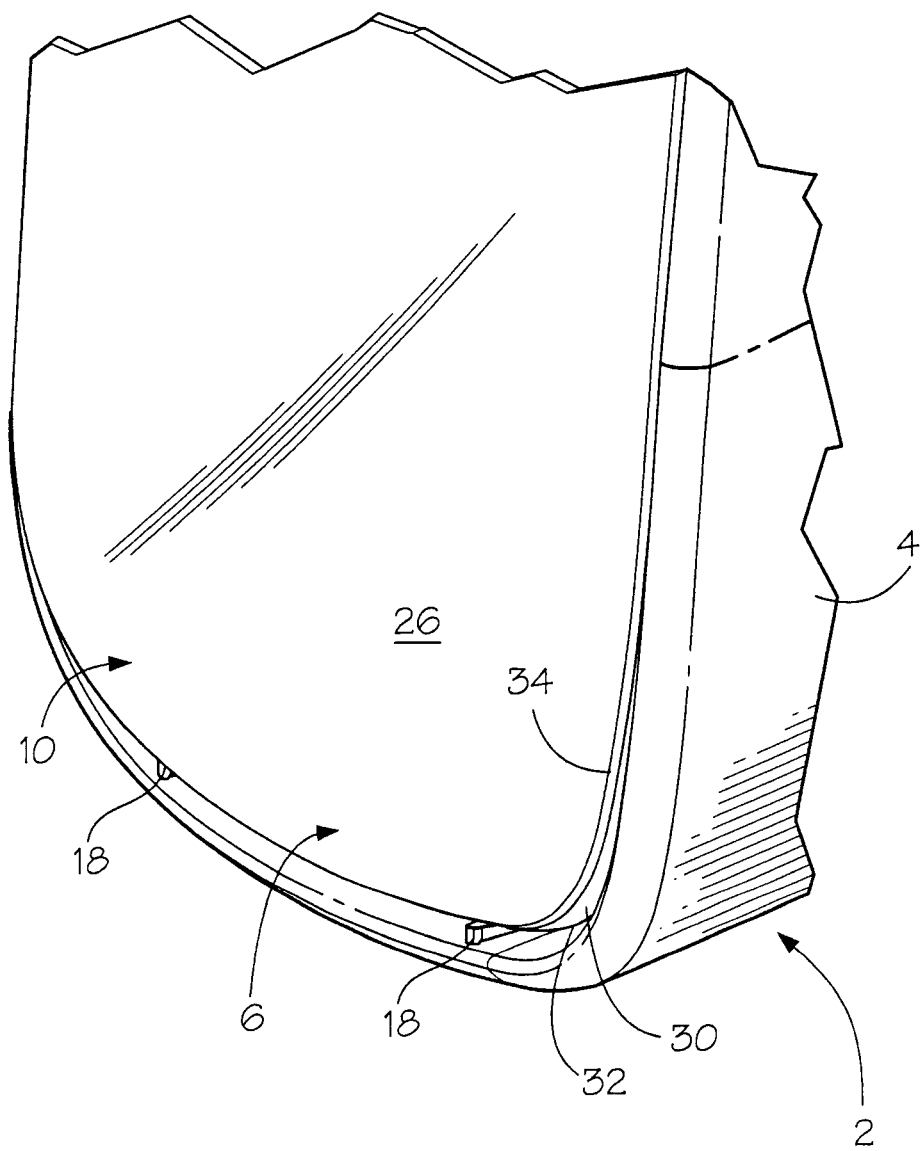
FIG. 1 shows a perspective representation of a part of a mirror head with a glass unit according to the present invention.
Figure 2:
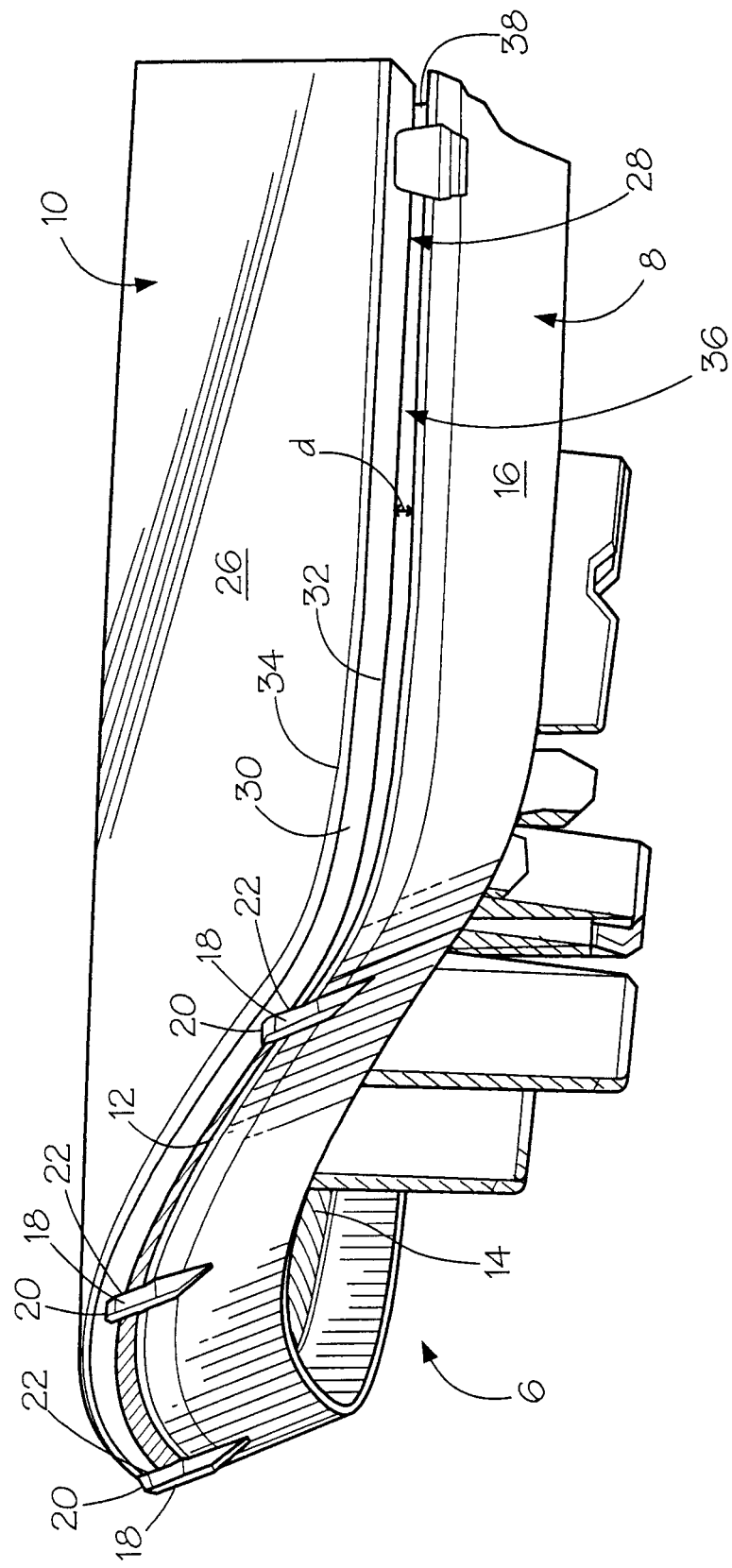
FIG. 2 shows a perspective representation of an exemplary embodiment of the glass unit removed from the housing according to the present invention.
Figure 3:
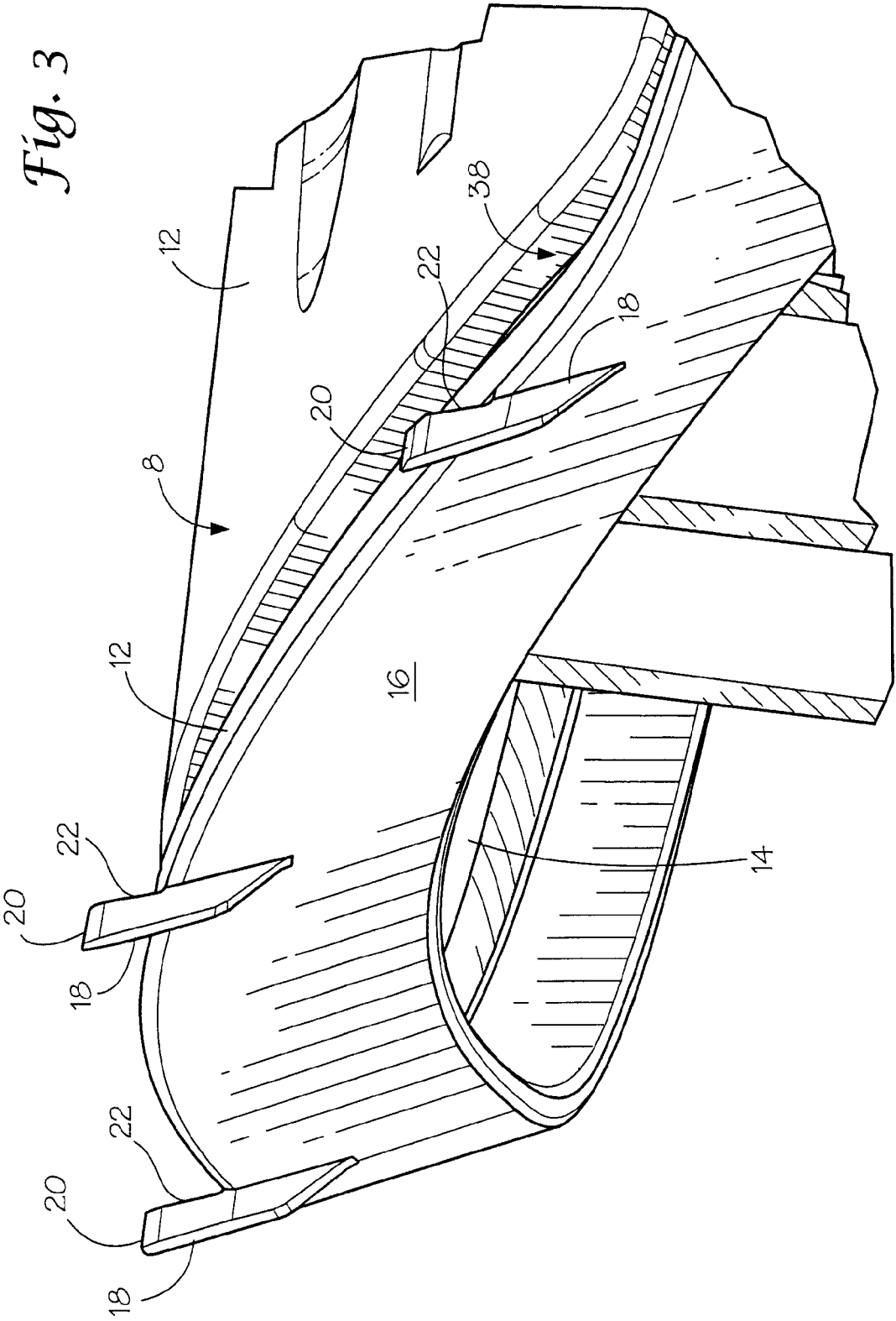
FIG. 3 shows a perspective representation of the glass carrier plate with holding bars according to the present invention; and, FIG. 4 shows a cross section perspective representation through a portion of the mirror head.

With reference to the drawings, the invention will now be described in more detail. Referring to FIG. 1, a perspective of a lower part of a mirror head, designated generally as 2, with housing 4 and a glass unit, designated generally as 6, is shown. With further reference to FIG. 2, the glass unit 6 includes a glass carrier plate, designated generally as 8, and a mirror plate 10. As shown in FIGS. 2 and 3, the glass carrier plate 8 has a front side 12 on which the mirror plate 10 is attached and a rear side 14 with which the glass unit is mounted to an adjusting device. An edge zone 16 is constructed between the front side 12 and the rear side 14.

Distributed over the circumferential edge zone 16, a multitude of holding bars 18 are formed on the edge zone 16. The holding bars 18 are pin-shaped and have a rectangular cross section. The holding bars 18 extend in the direction of the mirror plate 10 above the surface defining the front side 12 of the glass carrier plate 8. The holding bars 18 end in free ends 20, which do not protrude over the top of front side 26 of the mirror plate 10.

Figure 4:
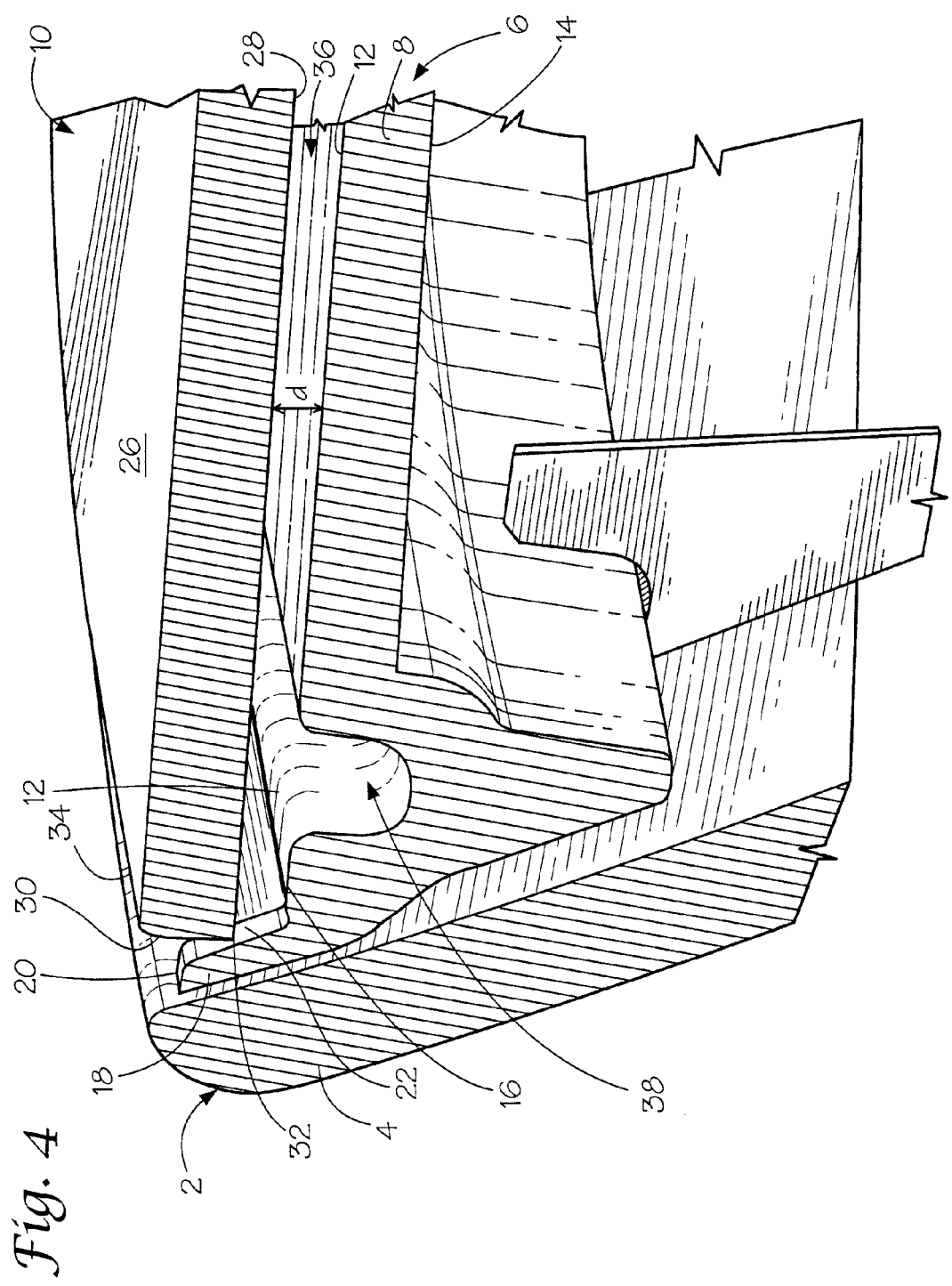

As shown in FIGS. 3 and 4, the holding bars 18 have planar contact surfaces 22 that are arranged generally perpendicular to and face in the direction of front side 12 of glass carrier plate 8. The contact surface 22 intersecting with front side 12 at edge zone 16. These planar contact surfaces 22 incline outward from the front side 12 and edge zone 16 of the glass carrier plate to free ends 20 of the holding bars 18. The mirror plate 10 and glass carrier plate may be curved. In this arrangement, mirror plate 10 may have a concavely curved mirror plate back side 28 facing and cooperating with a convexly curved front side 12 of the glass carrier plate 8, a concavely curved mirror plate front side 26 and a circumferential edge 30. The circumferential edge 30 of mirror plate 10 includes a back side edge 32 and a front side edge 34. The front side edge 34 is beveled in order to avoid injuries to persons. The rear side edge 32 of the mirror plate 10 lies against and on the contact surfaces 22 of the holding bars 18.

The mirror plate 10 is fixed with an adhesive layer 36 to the glass carrier plate. The contact surface 22 of the holding bars 18 is tilted and inclines outwardly from the glass carrier plate. This inclination of the contact surface 22 and the dimensions of the mirror plate 10 and the front side 12 of the glass carrier plate 8 determine the distance of the mirror plate 10 from the front side 12 of the glass carrier plate 8 and, therefore, the thickness of the adhesive layer 36. Inclining contact surface 22 also produces a centering effect when installing the mirror plate.

On the front side 12 of the glass carrier plate 8, a circumferential overflow channel 38 is provided that captures excess adhesive in the edge area directly next to the circumferential edge zone 16.

The glass carrier plate 8 is produced in one piece by injection molding. During assembly of the curved mirror plate 10 on the front side 12 of the glass carrier plate 8, a predetermined quantity of adhesive is initially applied to the front side 12 of the glass carrier plate 8. Subsequently, the mirror plate 10, with its concavely curved mirror plate back side 28, is placed onto a complementary concave front side 12 of the glass carrier plate 8 and due to its dimensions lies on the inclined contact surfaces 22 of the holding bars 18. The inclination of the contact surfaces 22 and the mirror plate 10 as well as the glass carrier plate 8 are dimensioned in such a way that said inclination determines the distance (d) of the mirror plate 10 from the glass carrier plate 8 and, therefore, the thickness of the adhesive layer 36. Additionally, the assembly of the mirror plate 10 on the glass carrier plate 8 is simplified with the inclination of the glass carrier plate 8 because a centering effect is achieved with the inclination.

The holding bars 18 taper with regard to the circumferential direction of the edge zone 16 upward in the direction of the free ends 20. In this way, the holding bars 18 are practically invisible on the completely assembled mirror because only the small free ends 20 of the individual holding bars 18 are visible on the completely assembled outside mirror and the mirror head.

Alternatively, the holding bars can also be constructed with a round cross section, whereby the holding bars then taper conically in the direction of their free ends.

While a preferred embodiment of the invention has been described using specific terms, such description is for illustrative purposes only, and it is to be understood that changes and variations may be made without departing from the spirit or scope of the following claims.

REFERENCE SYMBOL LIST

2 Mirror head
4 Housing
6 Glass unit
8 Glass carrier plate
10 Mirror plate
12 Front side of 8
14 Back side of 8
16 Edge zone of 8
18 Holding bars
20 Free ends of 18
22 Contact surface of 18
26 Mirror plate front side
28 Mirror plate back side
30 Circumferential edge of 10
32 Back side edge of 10
34 Front side edge of 10
36 Adhesive layer
38 Overflow channel (d) Distance between glass carrier plate and mirror plate as well as thickness of the adhesive layer

What is claimed is:

1. A glass unit for a vehicle mirror assembly, said glass unit comprising:
   a glass carrier plate that includes a front side, a back side and a circumferential edge zone;
   a mirror plate with a mirror plate front side, a mirror plate back side and a circumferential edge, wherein said mirror plate back side is attached by means of an adhesive layer on said front side of said glass carrier plate; and,
   a series of individual holding bars carried by and extending from said circumferential edge zone of said glass carrier plate, said holding bars being laterally spaced from each other so as to be distributed along said circumferential edge zone, and said circumferential edge of said mirror plate engaging said holding bars so that said mirror plate is spaced from and positioned over said front side of said glass carrier plate.

2. The glass unit of claim 1 wherein said holding bars extend outward from said edge zone of said glass carrier plate and protrude above a surface defining said front side of said glass carrier plate.

3. The glass unit of claim 1 wherein said holding bars each have a flat contact surface receiving said circumferential edge of said mirror plate, wherein said holding bars determine a distance (d) of said mirror plate from said glass carrier plate and a thickness (d) of said adhesive layer fixing said mirror plate to said glass carrier plate.

4. The glass unit of claim 3 wherein said contact surface is inclined from said edge zone to a free end.

5. The glass unit of claim 1 wherein said holding bars are tapered from said edge zone to a free end so that a cross section area of said holding bars being smaller in an area of said free ends than in areas closer to said glass carrier plate.

6. The glass unit of claim 1 wherein said holding bars having a generally rectangular cross section.

7. The glass unit of claim 1 wherein free ends of said holding bars do not project beyond said mirror plate front side.

8. The glass unit of claim 1 wherein an overflow channel is disposed in said front side of said glass carrier plate generally adjacent said edge zone for receiving excess adhesive.

* * * * *